Aug. 10, 1926.
C. GARDNER
VELOCIPEDE
Filed April 7, 1926
1,595,462
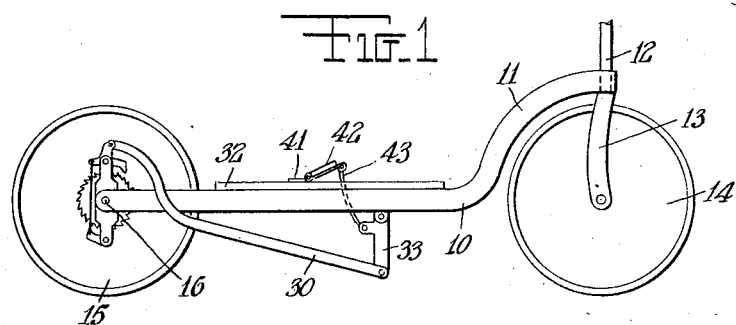
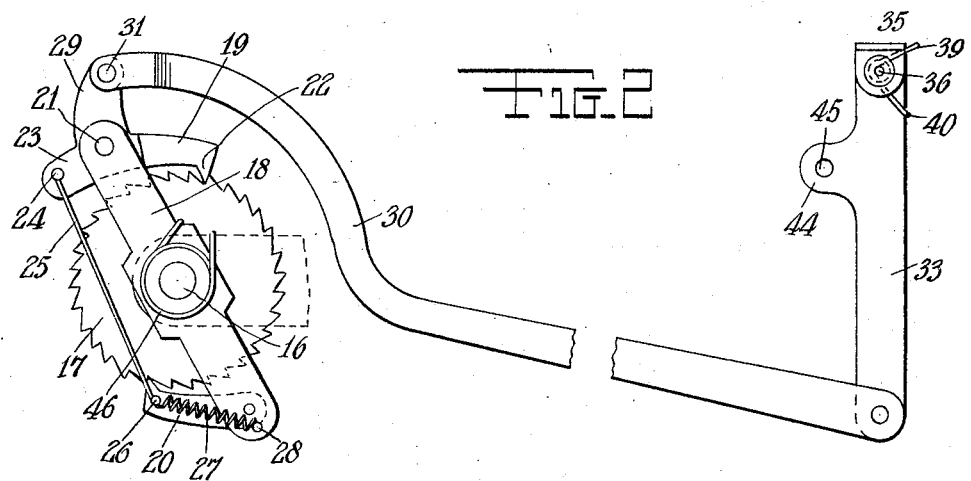
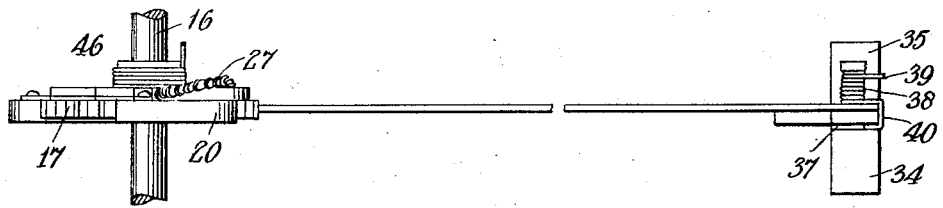
INVENTOR
*C. Gardner*
BY
ATTORNEY Patented Aug. 10, 1926.

1,595,462

UNITED STATES PATENT OFFICE.

CHRISTIAN GARDNER, OF BROOKLYN, NEW YORK.

VELOCIPEDE.

Application filed April 7, 1926. Serial No. 100,255.

The main object of this invention is to provide a scooter having for its main characteristic mobility in travel. The scooter is equipped with a pedal rod which is alternately depressed and lifted and operates an escapement ratchet which permits coasting of the scooter on down-grade surfaces without operation of the propelling mechanism.

Another object is to provide a scooter having an improved type of propelling mechanism on which a pedal is provided and additional means for normally retaining this pedal in raised position.

The above and other objects will become apparent in the description below, in which characters of reference refer to like-named parts in the drawing.

Referring briefly to the drawing, Figure 1 is a side elevational view of a scooter, showing the application of the propelling mechanism thereto.

Figure 2 is an enlarged front elevational view of the propelling mechanism per se.

Figure 3 is a side elevational view of Figure 2.

Referring in detail to the drawing, the numeral 10 indicates one of a pair of sidewise aligned straps which form the framework of the scooter. At the front 11, these straps are curved upwardly and forwardly into a sleeve which receives the steering rod 12 of a fork 13. This fork is supported upon a front turnable traction wheel 14. At the rear, the frame is spread apart so that the straps 10 are spaced to permit the insertion of a rear traction wheel 15, said traction wheel being supported on a shaft 16. A ratchet wheel 17 is mounted rigidly to the shaft adjacent one side or face of the rear traction wheel 15. This ratchet is firmly secured to the shaft 16 and rotates therewith. Adjacent the shaft, a longitudinal bar 18 is positioned. This bar has an opening intermediate its length receptive of the shaft 16 upon which the bar is fulcrumed and is wholly supported on said shaft. The bar normally extends vertically downward; at an angular plane at its outer ends is a pair of pawls 19 and 20 pivoted thereon. The pawl 19 extends on both sides of the pivot stud 21 which is anchored in one end of the bar 18, one end of said pawl having a tooth 22 thereon engageable in the notches formed by the teeth of the ratchet 17. The opposite end 23 of this pawl extends in an opposite direction from the pivot stud 21 and has a screw 24 mounted thereon which anchors one end of a tie rod 25 to said pawl. The opposite end of the tie rod is secured to the toothed end of the pawl 20, the securing means being a screw 26 which is fixed on the free end of said pawl 20. An additional spring 27 has one end looped around this screw 26 and its opposite end is secured to a screw 28 mounted on the lower end of the bar 18. This spring normally exerts a pull upon the pivoted pawl 20 in the direction in which the toothed portion of said pawl disengages from the teeth of the ratchet wheel and thru the medium of the tie rod, both pawls are simultaneously thrown out of engagement with the teeth of the ratchet. The pawl 20 has a right angled extension 29 thereon to which one end of a curved connecting rod 30 is fastened by a pin 31. This connecting rod extends forwardly beneath the platform 32 of the scooter and its forward end is connected to the lower end of a lever 33. The upper end of said lever is pivoted between a pair of brackets 34 and 35 upon a pin 36. This pin extends thru the ears 37 of the brackets 35 and 34 and projects a distance beyond the ear of the bracket 35. Around this projecting end of the pin, a spring 34 is coiled. One end 39 of this spring engages the bracket 35 while the opposite end 40 of the spring is partly looped about the forward edge of the lever 33, as indicated in Figures 2 and 3.

Upon the upper surface of the scooter platform 32, a hinge 41 is fixed. The free portion of this hinge has a pedal board 42 mounted thereon. Attached to the free end of the hinge is a forked turn-buckle which is connected to a pedal rod 43. The opposite end of this pedal rod connects with an extension 44 by inserting the pin thru the end of the pedal rod and the opening 45.

The scooter is used by a single passenger who stands upon the platform 32 with one foot upon the pedal board 42. This pedal board 42 is normally raised to a position shown in Figure 1, or even higher when the bar 18 is in an angular position, as indicated in Figure 2. The pedal board is normally retained in this raised inclined position when no downwardly pressure is exerted upon it by the end 40 of the spring 38, which end engages the lever 33 and rotates the latter rearwardly. The pedal rod 43, being connected to member 44, and the hinge 41, which supports the pedal board 42, causes the latter to normally remain in raised position unless depressed by the foot. Placing a foot upon the pedal board 42 and pressing the latter downwardly, urges the lever 33 forwardly thru the medium of the pedal rod 43. In urging the lever 33 forwardly, the connecting rod 30 is pulled forwardly a distance equal to the arc of travel of the free end of said lever 33. The lever 30, when pulled forwardly, rotates the pawl 19 into engagement with the teeth of the ratchet 17, which latter is fixedly connected to the shaft 16 upon which the traction wheel 15 is permanently secured. The engagement of the pawl with the teeth of the ratchet wheel is accomplished with a very small longitudinal movement of the connecter bar 30 and the remainder of the movement of said connecter bar rotates the bar 18 toward the front of the scooter. To cause the opposite dog 20 to simultaneously engage or disengage with the teeth of the ratchet, the pawls 20 and 19 are connected by a tie rod 25, which tie rod is secured to the pawl 19 at the end opposite to the tooth 22 and is secured to the opposite pawl at the toothed end thereof. When a stroke of the connecting rod has been completed and the pedal has been depressed to its extreme limit, the foot is lifted therefrom and the entire mechanism is again rotated automatically to the position indicated in Figure 2 and both pawls, at the beginning of this forward movement of the mechanism, are released by the spring 27 which exerts an outward pull upon the pawl 20, causing the latter to disengage from the teeth of the ratchet wheel, and thru connection of both pawls by the tie rod, said pawls are simultaneously disengaged from the ratchet wheel 17. The rearward movement of the entire mechanism, including the lever 33, connecting rod 30, bar 18, and the pawls 19 and 20, is accomplished by the spring 38, previously described, and an additional spring 46, which latter is coiled about the shaft 16 and its opposing ends are respectively secured to one of the straps 10 and to the bar 18, as illustrated in Figure 2. When coasting with this vehicle is desired, the foot is simply removed from the pedal board 42. This pedal board assumes its normal inclined position in which the mechanism positions itself as shown in Figure 2, permitting the ratchet free movement, and as the ratchet is not interfered with in its rotation and is rigidly secured to the shaft 16, rotation of this shaft and the traction wheel mounted thereon is assured.

I claim:—

1. A scooter having a wheeled body and a front wheel and a rear wheel supporting said body, a platform, a shaft supporting said rear wheel, a ratchet wheel rigid on said shaft, pawls engaging said ratchet wheel, means for rotating said ratchet wheel comprising a connecter bar secured to one of said pawls, means for reciprocating said connecter bar to cause engagement of one of said pawls comprising a lever pivoted at one end and pivotally engaging said connecter bar, said pawls alternately engaging the ratchet wheel, said lever when rotated being adapted to reciprocate the connecter bar to cause engagement of one of said pawls with the teeth and rotation of said ratchet wheel.

2. A scooter having a wheeled body and a front wheel and a rear wheel supporting said body, a platform, a shaft supporting said rear wheel, a ratchet wheel rigid on said shaft, pawls engaging said ratchet wheel, means for rotating said ratchet wheel comprising a connecter bar secured to one of said pawls, means for reciprocating said connecter bar to cause engagement of one of said pawls comprising a lever pivoted at one end and pivotally engaging said connecter bar, said lever when rotated being adapted to reciprocate the connecter bar to cause engagement of one of said pawls with the teeth and rotation of said ratchet wheel, a floating bar rotatively mounted on said shaft, said pawls being pivotally mounted on said floating bar, one of said pawls having an extension thereon, and means on said extension for connecting both pawls for simultaneous engagement or disengagement with the ratchet wheel.

3. A scooter having a wheeled body and a front wheel and a rear wheel supporting said body, a platform, a shaft supporting said rear wheel, a ratchet wheel rigid on said shaft, pawls engaging said ratchet wheel, means for rotating said ratchet wheel comprising a connecter bar secured to one of said pawls, means for reciprocating said connecter bar to cause engagement of one of said pawls comprising a lever pivoted at one end and pivotally engaging said connecter bar, said lever when rotated being adapted to reciprocate the connecter bar to cause engagement of one of said pawls with the teeth and rotation of said ratchet wheel, a floating bar rotatively mounted on said shaft, said pawls being pivotally mounted on said floating bar, one of said pawls having an extension thereon, a tie rod connecting the extension on one pawl with the free end of the opposite pawl, said tie rod causing simultaneous engagement or disengagement of the pawls with the ratchet, and means for normally disengaging said pawls from the ratchet wheel.

4. A scooter having a wheeled body and a front wheel and a rear wheel supporting said body, a platform, a shaft supporting said rear wheel, means for rotating said ratchet wheel comprising a connecter bar secured to one of said pawls, means for reciprocating said connecter bar to cause engagement of one of said pawls comprising a lever pivoted at one end and pivotally engaging said connecter bar, said lever when rotated being adapted to reciprocate the connecter bar to cause engagement of one of said pawls with the teeth and rotation of said ratchet wheel, a floating bar rotatively mounted on said shaft, said pawls being pivotally mounted on said floating bar, one of said pawls having an extension thereon, a tie rod connecting the extension on one pawl with the free end of the opposite pawl, said tie rod causing simultaneous engagement or disengagement of the pawls with the ratchet, means for normally disengaging said pawls from the ratchet wheel comprising a spring having one end mounted on the floating bar and its opposite end secured to one of the pawls, said spring being adapted to rotate said pawl out of engagement with the ratchet wheel and simultaneously disengage the opposite pawl thru the medium of the tie rod, and means for normally urging said floating bar, connecting bar, and lever, rearwardly to the inactive position.

5. A scooter having a wheeled body and a front wheel and a rear wheel supporting said body, a platform, a shaft supporting said rear wheel, a ratchet wheel rigid on said shaft, pawls engaging said ratchet wheel, means for rotating said ratchet wheel comprising a connecter bar secured to one of said pawls, means for reciprocating said connecter bar to cause engagement of one of said pawls comprising a lever pivoted at one end and pivotally engaging said connecter bar, said lever when rotated being adapted to reciprocate the connecter bar to cause engagement of one of said pawls with the teeth and rotation of said ratchet wheel, a floating bar rotatively mounted on said shaft, said pawls being pivotally mounted on said floating bar, one of said pawls having an extension thereon, a tie rod connecting the extension on one pawl with the free end of the opposite pawl, said tie rod causing simultaneous engagement or disengagement of the pawls with the ratchet, means for normally disengaging said pawls from the ratchet wheel comprising a spring having one end mounted on the floating bar and its opposite end secured to one of the pawls, said spring being adapted to rotate said pawl out of engagement with the ratchet wheel and simultaneously disengage the opposite pawl thru the medium of the tie rod, a spring engaging said lever normally urging the latter rearwardly, and an additional spring mounted on said shaft urging the floating bar rearwardly into inactive position simultaneously with the function of the spring engaging the lever, and means for rotating said lever forwardly to cause engagement of both pawls with the ratchet wheel and successive rotation of the latter.

6. A scooter having a wheeled body and a front wheel and a rear wheel supporting said body, a platform, a shaft supporting said rear wheel, a ratchet wheel rigid on said shaft, pawls engaging said ratchet wheel, means for rotating said ratchet wheel comprising a connecter bar secured to one of said pawls, means for reciprocating said connecter bar to cause engagement of one of said pawls comprising a lever pivoted at one end and pivotally engaging said connecter bar, said lever when rotated being adapted to reciprocate the connecter bar to cause engagement of one of said pawls with the teeth and rotation of said ratchet wheel, a floating bar rotatively mounted on said shaft, said pawls being pivotally mounted on said floating bar, one of said pawls having an extension thereon, a tie rod connecting the extension on one pawl with the free end of the opposite pawl, said tie rod causing simultaneous engagement or disengagement of the pawls with the ratchet, means for normally disengaging said pawls from the ratchet wheel comprising a spring having one end mounted on the floating bar and its opposite end secured to one of the pawls, said spring being adapted to rotate said pawl out of engagement with the ratchet wheel and simultaneously disengage the opposite pawl thru the medium of the tie rod, a spring engaging said lever normally urging the floating bar rearwardly into inactive position simultaneously with the function of the spring engaging the lever, means for rotating said lever forwardly to cause engagment of both pawls with the ratchet wheel and successive rotation of the latter comprising a pedal rod, an extension on said lever intermediate its length, said pedal rod being secured to said extension, and a hinged pedal board pivotally connected to said pedal rod adapted to be depressed to rotate said lever and cause longitudinal forward movement of the connecting rod.

In testimony whereof I affix my signature.

CHRISTIAN GARDNER.